United States Patent [19]

Banner

[11] 4,061,571
[45] Dec. 6, 1977

[54] MARINE WATER INLET DEVICE

[76] Inventor: Philip M. Banner, P.O. Box 307, Massapequa, N.Y. 11758

[21] Appl. No.: 525,100

[22] Filed: Nov. 19, 1974

Related U.S. Application Data

[63] Continuation-in-part of Ser. No. 343,121, March 20, 1973, Pat. No. 3,864,260.

[51] Int. Cl.² ............................................. B01D 35/16
[52] U.S. Cl. ................................. 210/130; 210/152; 114/198; 123/41.09; 134/166 C
[58] Field of Search .................. 210/85, 90, 107, 108, 210/242 R, 459, 460, 461, 411, 152, 130; 123/41.08, 41.09; 114/198; 115/40; 134/166 C

[56] References Cited

U.S. PATENT DOCUMENTS

| | | | |
|---|---|---|---|
| 648,923 | 5/1900 | Chavette | 114/198 |
| 969,364 | 9/1910 | Grootenhuis | 210/460 X |
| 1,278,882 | 9/1918 | Donnell | 114/198 |
| 2,237,964 | 4/1941 | Haught | 210/108 X |
| 2,350,598 | 6/1944 | Laville | 123/41.09 |
| 2,563,180 | 8/1951 | McFarlan | 210/459 X |
| 2,564,402 | 8/1951 | MacArthur | 134/166 |
| 3,105,472 | 10/1963 | Jasper | 123/41.08 |
| 3,168,467 | 2/1965 | Dreyer | 210/108 |
| 3,220,553 | 11/1965 | Growall et al. | 210/108 |
| 3,244,283 | 4/1966 | Woody | 210/108 |
| 3,323,502 | 6/1967 | Whalen | 123/41.09 |
| 3,526,547 | 9/1970 | Shock | 134/166 |
| 3,630,362 | 12/1971 | Matthews | 210/108 |
| 3,644,915 | 2/1972 | McBurnett | 210/90 |
| 3,750,885 | 8/1973 | Lournier | 210/108 |
| 3,786,920 | 1/1974 | Raymond | 210/90 |
| 3,864,260 | 2/1975 | Banner | 210/411 |

Primary Examiner—Thomas G. Wyse

[57] ABSTRACT

A water inlet cleaning means for Marine Craft and fluid supply systems that will clean out the inlet pipe and inlet fittings of foreign matter, allowing liquids to flow. The water inlet device includes adapters that attach to the inlet pipe and new water inlet devices responsive to signal means, to pressure means that operate manually or automatically indicating a clogging condition in water pipes, outboard and inboard-outboard motors and inboard motors and each of the water inlets are kept free of clogging by the subsequent operation of these safety devices.

4 Claims, 11 Drawing Figures

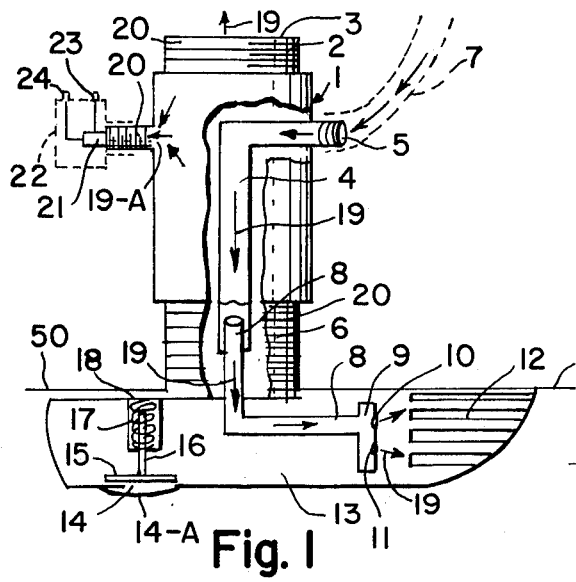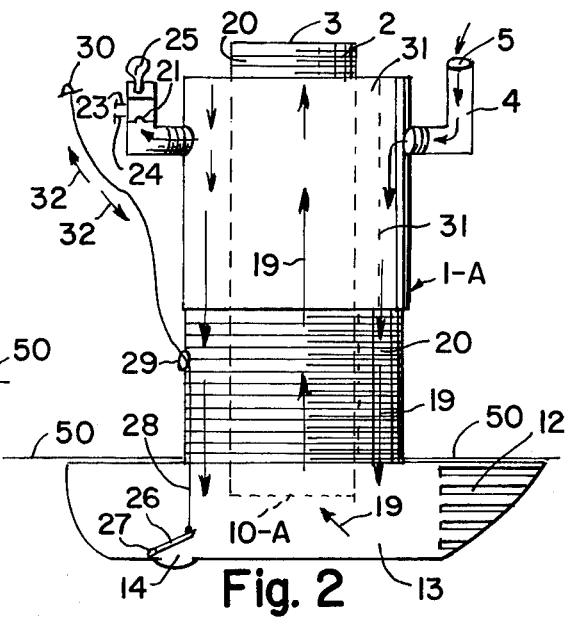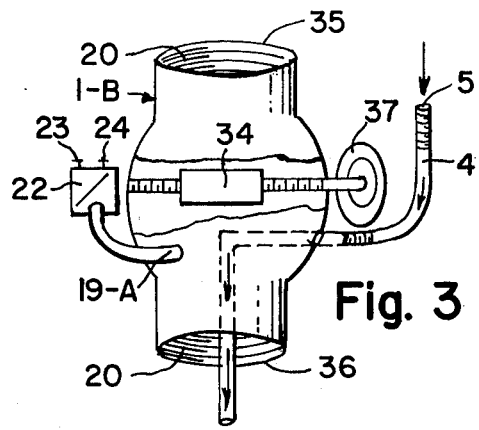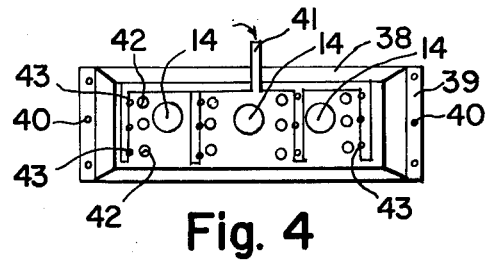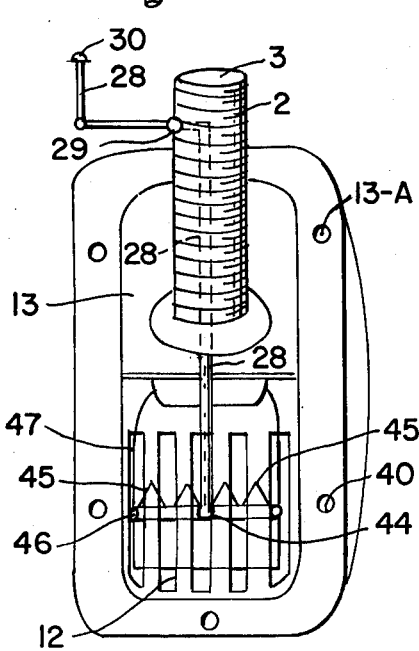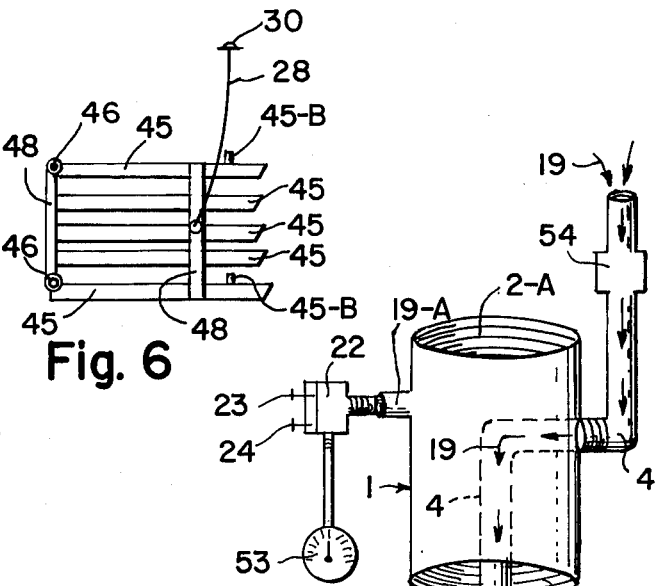

MARINE WATER INLET DEVICE

BACKGROUND OF THE INVENTION

This invention application is a continuation in part to my prior application Ser. No. 343,121 filed Mar. 20, 1973, now U.S. Pat. No. 3,864,260.

That patent application shows Marine Water Inlet Devices having various means of hand pump and other pressure sources as a means to keep the water inlet device unclogged. The present application improves the devices by means of adapters that fit onto inlet devices made so as to keep them free of debris and clogging. In addition to the new adapters there is new means shown in the form of new inlet devices and new protective screens for these devices along with a secondary water inlet opening that responds to opening in emergency situations providing safety for marine and industrial uses, shown in the drawings and fully described in the specifications, having at least one or more emergency openings.

SUMMARY OF THE INVENTION

Specifically, these water inlet adapters and inlet cleaning devices are fully adaptable to all marine situations involving outboard or inboard motors and any combination thereof in addition to water supply from fire or industrial water supply means and generally useful whereever liquids must flow through unrestricted pipes. This device can be used on gas and oil lines keeping any predetermined part of a inlet system unclogged at the inlet or at any part within the pipe to the suction and the supply side of a liquid system.

These and other important features of the invention will now be described in detail in the following specification, naming each part and describing its function as shown on the drawings, and also, pointed out more particularly in the appended claims.

A principal object of the invention is to provide a new and improved water inlet device means for boats, ships, yachts, tugs and submarines.

Another object of the invention is to provide a new water inlet device that is comprised of new water inlets and adapters responsive to keeping water inlets open for fluids to flow safely.

Another object of the invention is to provide new water inlet devices for use on fire and industrial uses where flow of liquids needs assurance, of continued flow for safety and other purposes.

Another object of the invention is to provide a new and improved means of detecting a loss of liquid flow.

Another object of the invention is to provide new and improved means of indicating and controling liquid flow conditions that operate manually or automatically as may be required for all marine uses.

Another object of the invention is to safeguard all water cooled engines and exhaust systems and outboard motors from overheating to prolong their useful life expectancy.

Another object of the invention is to provide new and improved pressurized chemicals, air or liquid means for de-clogging a water system.

Another object of the invention is to provide new and improved water inlet devices having more than one inlet opening becoming a means of supply when a first water inlet opening becomes clogged and inoperative.

Another object of the invention is to provide new and improved water inlet protective screens that have water inlet cleaning means to keep said screens from becoming clogged and inoperative.

Another object of the invention is to provide new and improved vacuum indicating and control means having no flow and flow measurement capabilities.

Another object of the invention is to provide a new and improved manually operated inlet cleaner comprising a slidable cleaning means that agitates clogged materials on a water inlet, disposing of same.

Another object of the invention is to provide new and improved water inlet cleaning means comprising a hinged manually operated or automatic set of cleaning blades that is responsive to cleaning out clogged material from a water inlet device.

BRIEF DESCRIPTION OF THE DRAWINGS

These and other objects of the invention will be apparent from the following figures, of which;

FIG. 1 shows a side view of a water inlet adapter attached to a water inlet pipe and opening means showing a pressure pipe means connected to inlet opening and another opening in the adapter for flow indication and detection purposes, and a secondary emergency opening means, shown as it would be constructed in this model.

FIG. 2 shows a side view of another water inlet means having an adapter attached thereto employing built-in passages for flow of water upwards and flow of pressure released matter for unclogging a pipe or inlet opening. It also shows a secondary water or liquid opening in a different form operable by vacuum or hand linkage means, automatically or manually having a vacuum indicator and lamp and said adapter has male threads on its topside ready for attachment of other valves or parts customarily placed upon these devices.

FIG. 3 shows a side view of another adapter in a valve form having a pressure tube means in the center of the opening disposed to fitting in attachment to a corresponding receiving opening within a inlet opening not shown so that said adapter can be attached without concern for placement of said adapter to any preferred position. The adapter shows a vacuum control with electrical connections thereon.

FIG. 4 shows a top plan view of a water inlet protective screen having water or fluid inlet holes subject to becoming clogged and having a pressure inlet cleaning pipe attached so that when pressurized it will clean out said inlet holes.

FIG. 5 shows a top view of a water inlet device having a slidable shaft movable by manual or automatic means that when moved will place downward protruding separators into position to disengage any clogging material caught in the water inlet.

FIG. 6 shows a top view of a pivotable water inlet screen area cleaning device that is operatable by manual or automatic means and when exerted downward inside the water inlet will dislodge any and all clogged materials caught therein.

FIG. 7 shows a front view of a adapter attachable to water inlet devices having its built in pressure means for distribution of air, water chemicals or other matter including hand pumps and compressors that operate to supply pressure to the adapter to unclog clogged material in the inlet. It also clearly shows the flow operating condition by vacuum control through a switch and electrical connections to a signal device or an alarm for visio and audio advantages necessary flow controls for inlets.

DESCRIPTION OF THE PREFERRED EMBODIMENTS

Figure 8:
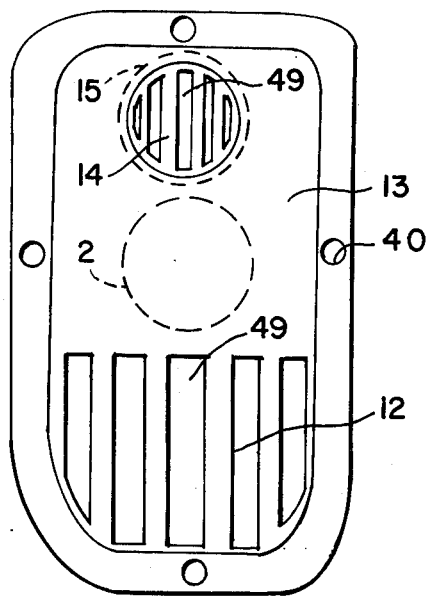
FIG. 8 shows a top view of the inside of a water inlet that shows the construction of the emergency secondary opening that opens under vacuum pressure when the first inlet opening becomes clogged.

FIG. 1 shows a inlet adapter 1 having at the top a male threaded nipple 2 for connection to the water inlet parts not shown. This is a preferred illustration that can be changed to include a female threaded member as required. The threaded nipple opening 3 allows the water or fluids to flow in the direction shown by the arrows 19. A reverse pressure pipe 4 is shown having a top opening 5 for connection to a clamp and hose 7 which is then connected to a unclogging pressure means that produces downward pressure through pressure pipe 4 to a water inlet below. The end of the pressure pipe 4 in the adapter 6 is made to connect to the water inlet pressure pipe 8 whether over it or inside it therefore connecting reverse pressure pipe 4 and the water inlet pressure pipe 8 together, allowing the adapter 1 to be connected to the water inlet body 13 each having said pipe means in the center of their diameter allowing free rotation while connecting the two said pressure pipe means 4 & 8. A pressure disperser pipe 9 is shown attached to the inlet pipe 8 as one illustration having two orifices shown 10 & 11 that release a pressure in the direction of the arrows 19. The front of the water inlet body 13 has an opening area 12 for water to flow into the said opening being the first opening means. A second opening means 14 is shown in a closed position having a protective grating 14-A a valve body 15 a valve stem 16 A valve tension spring 17 shown inside of the water inlet rear valve housing 18, direction of flow arrows 19 illustrate the movement of pressure or suction forces exerted upon the inlet device body 13 and the inlet adapter 1, pipe threads 20 show various places for attachment of parts and accessories to operate the water inlet devices of FIG. 1. Generally speaking FIG. 1 shows a water inlet adapter 1 that can be provided with a male or female counterparts that contains a pressure means within it and attachments thereto that facilitate the reverse flow of a pressurized substance through the adapter 1 to a water inlet body 13 to unclog clogged matter in the inlet device 13. Additionally, the inlet device 13 has been provided with a secondary emergency opening valve body 15 spring tension controlled 17 that opens when the first said means becomes clogged. In a separate action the reverse pressure cleans the inlet area and the second opening means closes back to its original position before the emergency. The vacuum side of the adapter 1 or the inlet 13 is provided with a no-flow or low-flow warning vacuum control switch 21 that will electrically indicate through a warning means shown in FIG. 2. The design of the adapter has been developed to allow the mating of the adapter 1 with any water inlet 13 for use on existing systems and their conversion or to originate new inlet devices 13 having the capability of eliminating the hazardous conditions resulting from a clogged inlet and no liquid flow. The opening 19-A from the adapter 1 into the vacuum switch 21 detects no flow.

FIG. 2 shows an adapter 1-A having considerable difference from the prior explanation of FIG. 1. This adapter 1-A illustrates a male thread 20 extruding from the top nipple opening and shows an internal reverse pressure chamber 31 that surrounds the suction inlet tube 10-A forming a natural cavity for reverse pressure downward through the pressure chamber 31 while coolants flow upward through the suction tube 10-A. This design of a larger chamber in the inlet adapter 1-A will allow the use of these adapters 1-A on existing systems of water inlets where the center pipe will protrude downward into the water inlet body 13 while the area around the inlet tube 10-A will provide the area for reverse flushing. The vacuum control switch 21 is shown connected to wiring terminals 23 & 24 for further connection to warning or remote indicating means away from the water inlet area preferably up at the instrument control area, the use of a indicating lamp 25 is illustrative of capability to produce a visual or audio control remote or on the device to warn of low or no-flow danger conditions where the flow of liquids must be maintained. As one can readily see the adapter 1-A is fully adaptable to inlet devices 13 presently used for coolants on engines, refrigeration plants, generator plants, electric motors, outboard motors and inboard outboard motors. Another important feature of FIG. 2 is the different secondary valve 26 having pivoting means 27 that controls water through a rear water inlet 14 operated by linkage 28 connected to a handle 30 placed remotely having a water seal 29 in the direction of movement shown 32. The hull 50 is shown and the water inlet 13 has a hull locking nut not shown that locks the inlet 13 to the hull 50.

FIG. 3 shows another water inlet adapter 1-B having female threads 20 in the top opening 35 and the bottom opening 36, having a vacuum tube connection 19-A connected to a vacuum control housing 22 with electrical terminals 23 & 24 for connection to remote indicating and alarm means not shown. The reverse flow pressure pipe 4 connects and protrudes downwardly through the center of the adapter 1-B that can be made longer to enter into a water inlet device and face the water intake area 12 shown in FIGS. 1 & 2 keeping same unclogged manually operated or semi and automatically controlled or operated by hand pump means. A gate valve body 34 is shown with a gate valve handle 37 because this arrangement will produce a water inlet adapter having a necessary valve along with low or no-flow warning and in addition a adapter having unclogging capability providing in the broadest sense a much needed safety device.

FIG. 4 shows a inlet device screen protector 38 having a mounting flange 39, screw holes 40 for attaching it to a hull with water emergency inlet valves 14 that open when the water inlet holes 42 become clogged. Reverse pressure holes 43 are shown connected to a pressure tube 41 showing distribution of pressure to all inlet opening areas that could become clogged and this would be connected through the hull with locking and seal means not shown to a pressure means of this invention.

FIG. 5 shows a water inlet device body 13 having linkage 28 provided through a seal 29 or separately through the hull that will allow movement of cleaning brushes or blades 45 operated on rollars 46 having a pivot means for the linkage attachment 44 operating within a track 47 built into the water inlet device 13. This same improvement can be made to operate remotely by other than hand power linkage means that will move a cleaning means 45 within the area to be unclogged that when it is out of use will not interfere with the water or fluids coming in to the inlet. The linkage 28 is shown connected through the inlet nipple 2 connected by threaded means to vertical linkage 28 that connects to the cleaning means 45.

FIG. 6 shows another cleaning apparatus that fits inside a water inlet body operated by linkage 28 or other means having cleaning blades 45 pivoting means 46 locking the corners in place and a structure 48 holding the cleaning blades in place. It also shows a simple lock 45-B as one illustration to lock the blade housing structure in place when out of use. This cleaning apparatus will exert downward pressure upon any substance clogging a water inlet and dispose of same quickly and safely.

FIG. 7 shows a water inlet adapter 1 by itself having a water inlet reverse pressure tube 4 a one way check valve 54 showing flow direction 19 t rough a centrally dispersed pressure tube 4 and having a vacuum opening 19-A connecting to a vacuum control housing 22 having a switch inside that operates when no flow or low flow conditions arise connected to terminals 23 & 24 for indicating and alarm means. Further, a vacuum gauge 53 is adapted to show the corresponding values in water flow instead of in inches of vacuum so that it becomes a operating gauge indicating on its gauge the volume of flow in terms of volume and provides a visual means of no flow or low flow detection when used without additional indication means. The adapter 1 can also be made to fit into existing inlet devices by lengthening the tube 4 to face the bottom openings 12 shown in FIGS. 1 & 2. When used with the newly designed opening of FIG. 1 showing how the adapter and the inlet device tubes mate it can then be provided separately as a device for cleaning inlets or together with the water inlet device 13 of FIG. 1.

FIG. 8 shows an inside view of a water inlet 13 with a cutout 2 where there is normally a inlet pipe through the hull and shows a water inlet rear inlet opening 14 having a valve body 15 shown in dotted lines. The metal inlet protector 49 and front water intake opening 12 and screw hole locking means 40 are shown. This illustration specifically shows one illustrated placement of the secondary water inlet opening 14 that would operate in emergency when the first inlet means becomes clogged. This does not preclude the development and further use of a third and fourth emergency means employed as implied in this invention.

Figure 9:
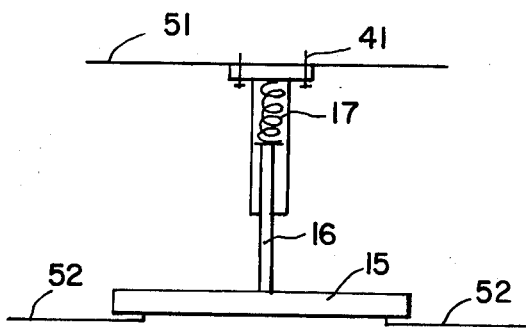
FIG. 9 shows the emergency secondary opening and its operating parts that can operate automatically by vacuum pressure or by a low water flow control operated remotely and by manual linkage to be opened when the first opening means is clogged or closed and when a greater amount of inlet exposure is required.

FIG. 9 shows the example parts of a secondary water inlet valve having a valve body 15, valve stem 16 and a tension spring 17 all built to specifications to withstand water corrosion factors. This illustration does not show a hydraulic or electric means of moving the secondary valve which is inherent to this application.

Figure 10:
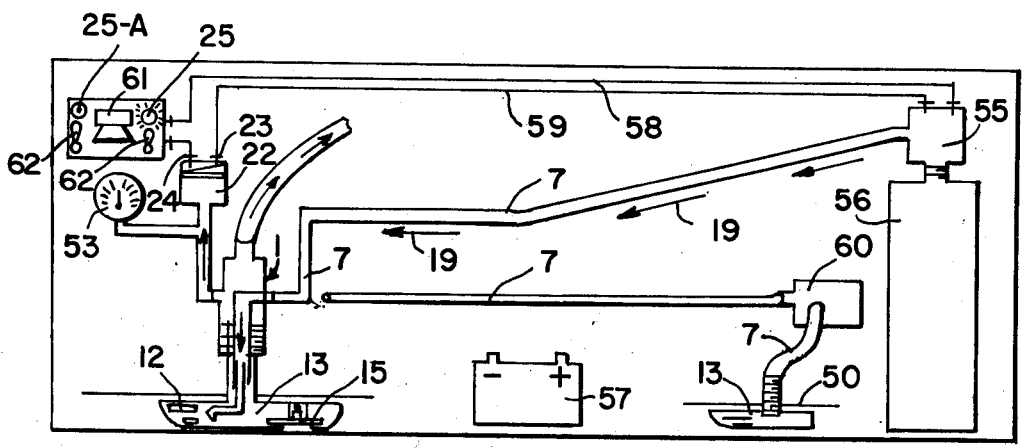
FIG. 10 shows the diagrammatic plan of the vacuum and electrical controls that would provide semiautomatic and automatic means of water inlet cleaning for engines and liquid flow pipes, generators & refrigeration.

FIG. 10 shows some of the preferred controls used in this invention. A pressure tank 56 or a water pump 60 or air compressor not shown is hooked up by tubing or hose to the water inlet adapter 1 to dispurse a reverse pressure flow to unclog clogged materials from the inlet. The adapter 1 has a vacuum control housing 22 connected to it with a fluid operating gauge 53 connected to it for visual readout purposes. The vacuum housing 22 has a switch not shown that is connected to terminals 22 & 23 that respond to low and no flow conditions and connect to an alarm 61. The control switches 62 are for on and off and selectivity of manual or automatic use of the device for releasing reverse pressure means to clean a water inlet. A manual switch & test switch 25-A lights an indicator switch 25 showing the system is working. The power supply 57 shown is the ordinary D.C. or A.C. supplied current preferably in 12 volts D.C. that would operate the solonoid electric valve 55 or a hydraulic valve. The use of an air pump or other means is not precluded where practical.

Figure 11:
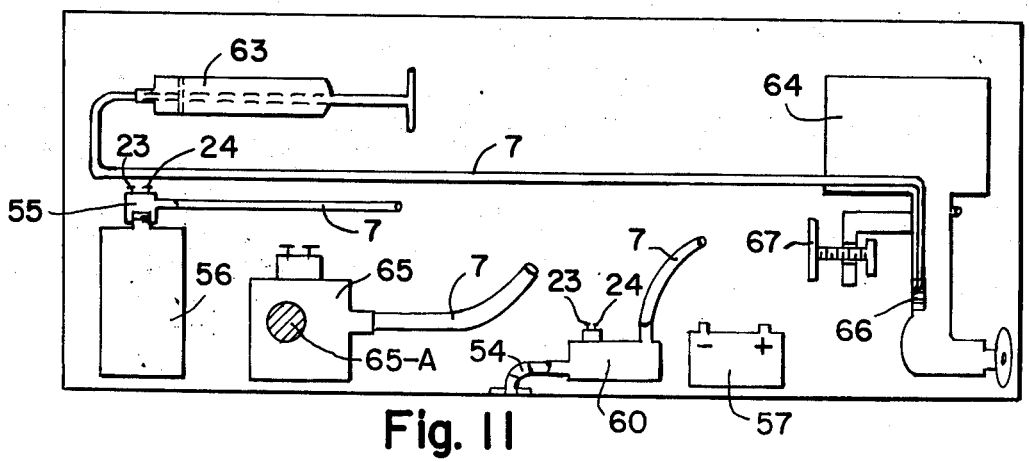
FIG. 11 shows a diagrammatic plan of a water inlet cleaning means for use in conjunction with all outboard engines and inboard-outboard engine combinations, and where ever such would be subject to clogging conditions that includes manual or automatic means of accomplishing such.

FIG. 11 shows a hand pump 63 connected by tubing 7 to an inlet 66 area on a outboard motor 64 either internally or externally supplying pressure to clean out the screened water intake area. A pressure tank means 56 supplies inlet cleaning means for units other than hand pump pressure having a solonoid valve 55 electrically operated by a battery 57 and control switches not shown that are attached to the warning devices of FIG. 10 and further explained in the specifications. An air pump 65 and breather 65-A is connected to a tube 7 for dispursement to a water inlet for unclogging use. A water pump 60 is shown also connected to a tube 7 that would be connected to the inlet adapter or inlet bottom device.

The use of another mechanical system may be preferred and easily accomplished by this invention. A manually controlled valve connected to mechanical or other means of linkage would dispurse pressure from a pressure source without the need for electrical power which may be very desirable for economy reasons, particularly on very small craft. Therefore a mechanical valve not shown would be desirable in some cases and are therefore claimed.

These devices are necessary for water inlets on small craft, yachts, ships, tugs, submarines and other water craft in addition to keeping open the intake ends of fluid pipes and remove the danger of clogging sometimes used by fire departments and for other commercial uses.

Thus it will be seen that there is provided new and improved water inlet devices in the form of adapters and water inlet means for rapidly and economically detecting any improper water inlet flow condition in the operation of any marine craft or liquid flow pipes where the inlet for safety reasons must be kept unclogged and operating at full capacity. While the invention has been disclosed by way of the preferred embodiment it will be appreciated that suitable modifications may be made therein without departing from the spirit and scope of the invention.

What is claimed is:

1. A marine water inlet device in combination with a marine vessel and providing the function of cleaning the water inlet of an engine having water flowing therethrough comprising, in combination, a marine vessel with a strainer located on an exterior surface of the hull of said marine vessel, said strainer including a chamber defined by an upper surface, depending sidewalls, and a lower surface, said upper surface being located adjacent the exterior surface of the hull of said marine vessel, inlet means for introducing water in said strainer chamber including perforate openings located in said chamber lower surface, outlet means located on said upper surface of said chamber including an enclosure adapter for passing said water from said chamber through said hull of said marine vessel and in fluid communication with said engine, said adapter enclosure having a housing with sidewalls and an open top and an open bottom, said open bottom being sealingly connected to an inlet end of a conduit with the opposite end of said conduit being connected to the liquid cooling system of said engine, a fluid conduit with an end connected to a source of liquid under pressure separate from the engine cooling system pressure means to maintain said liquid under pressure, said fluid conduit passing through the sidewall of said housing of said enclosure adapter and extending downwardly within said adapter enclosure into said strainer chamber for backwash of said perforate openings in said chamber.

2. A Marine water inlet device in combination with a marine vessel and providing the function of cleaning the water inlet of an engine having water flowing therethrough comprising, in combination, a marine vessel with a strainer located on an exterior surface of the hull of said marine vessel, said strainer including a chamber defined by an upper surface, depending sidewalls, and a lower surface, said upper surface being located adjacent the exterior surface of the hull of said marine vessel, inlet means for introducing water in said strainer chamber including perforate openings located in said chamber lower surface, outlet means located on said upper surface of said chamber including an enclosure adapter for passing said water from said chamber through said hull of said marine vessel and in fluid communication with said engine, said adapter enclosure having a housing with sidewalls and an open top and an open bottom, said open bottom being sealingly connected to an inlet end of a conduit with the opposite end of said conduit being connected to the liquid cooling system of said engine, a fluid conduit with an end connected to a source of liquid under pressure separate from the engine cooling system, pressure means to maintain said liquid under pressure, said fluid conduit passing through the sidewall of said housing of said enclosure adapter and extending downwardly within said adapter enclosure into said strainer chamber for backwash of said perforate openings in said chamber, emergency inlet opening means located in said chamber lower surface with closure means therefore consisting of a pressure operated by-pass valve.

3. Apparatus as in claim 2 wherein said by-pass valve has mechanical linkage means connected to said pressure operated by pass-valve whereby said valve may be operated to open said emergency inlet when clogging of the perforate openings into the strainer chamber occurs.

4. Apparatus as in claim 2 wherein said fluid conduit is connected to a source of pressure passing through the sidewall of said housing of said enclosure adapter enclosure into said strainer for backpressurizing of said perforate openings in said chamber, said pressure being of other than liquid form.

* * * * *